May 23, 1933. G. T. JACOCKS ET AL 1,910,392
WASTE HEAT RECLAIMER
Filed Feb. 4, 1932    2 Sheets-Sheet 2
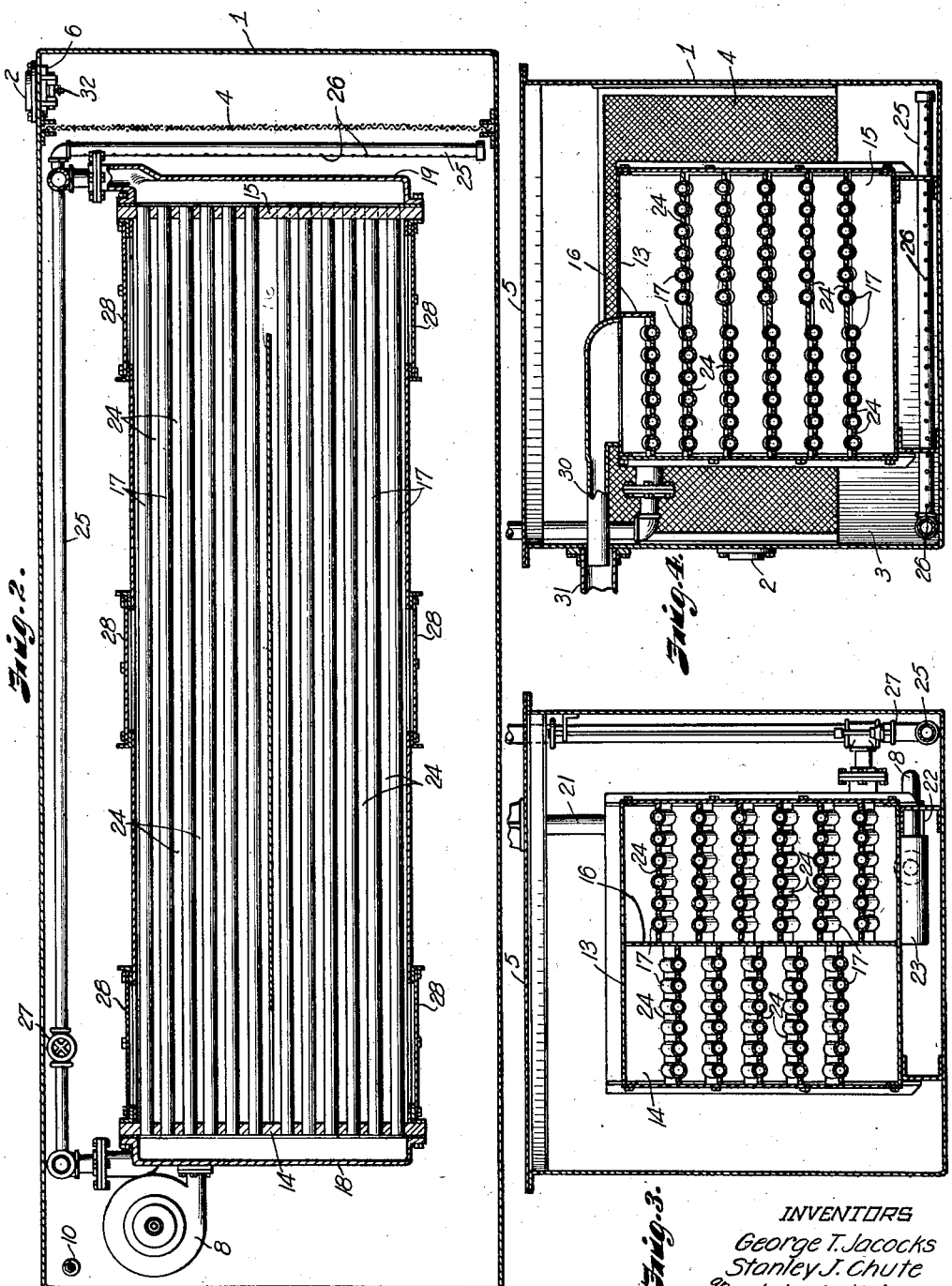
INVENTORS
George T. Jacocks
Stanley J. Chute
and John L. Krieg
Thos. E. Scofield
ATTORNEY Patented May 23, 1933

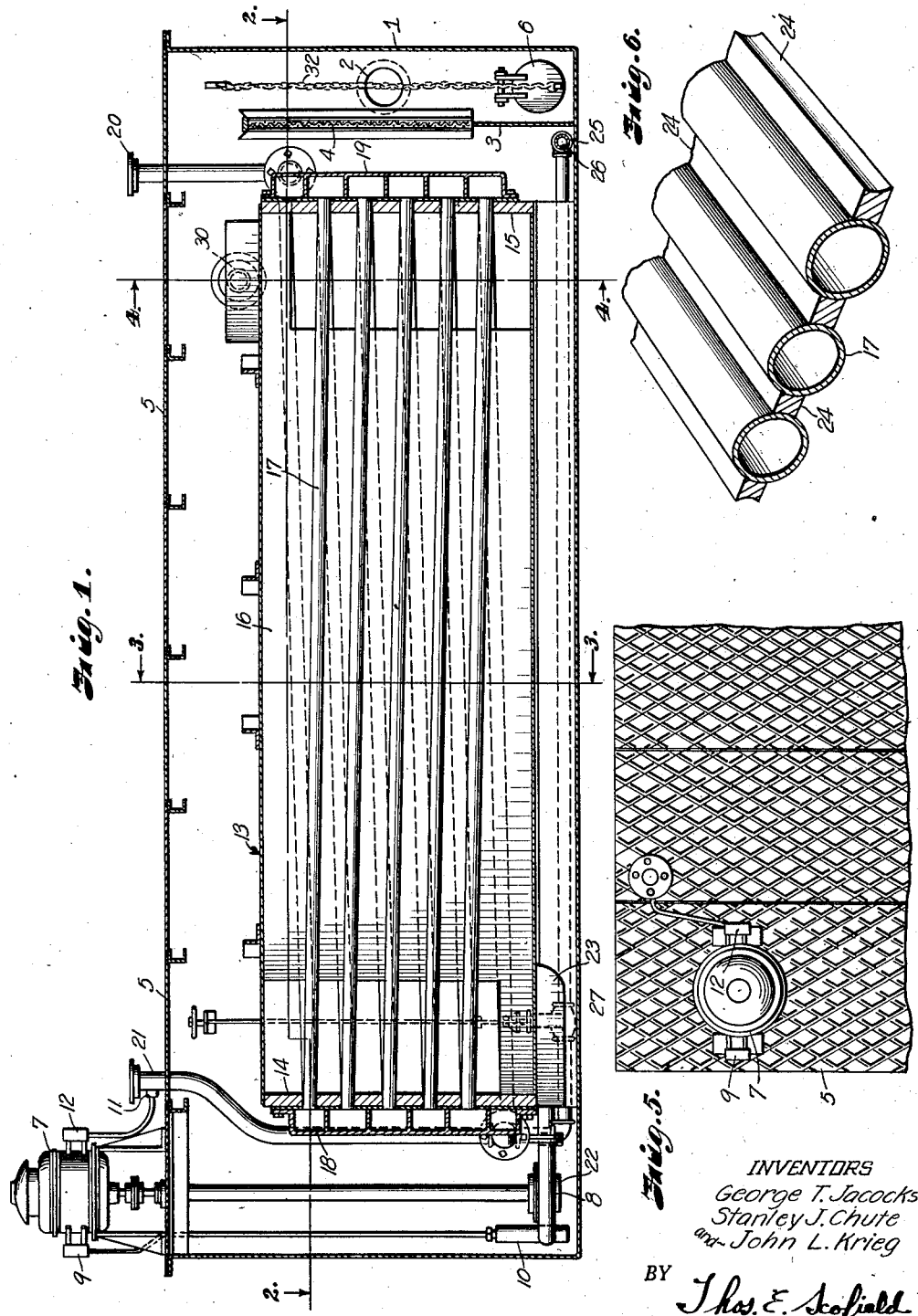

1,910,392

UNITED STATES PATENT OFFICE

GEORGE T. JACOCKS, STANLEY J. CHUTE, AND JOHN L. KRIEG, OF NEW YORK, N. Y., ASSIGNORS TO ALCO PRODUCTS, INCORPORATED, OF NEW YORK, N. Y., A CORPORATION OF DELAWARE

WASTE HEAT RECLAIMER

Application filed February 4, 1932. Serial No. 590,950.

Our invention relates to a waste heat reclaimer, that is, a device for utilizing the heat of waste fluids or water from industrial plants for preheating the cold, fresh, fluid required for manufacturing and other purposes.

In most industrial plants where large quantities of hot water are used for manufacturing purposes, as in laundries, dyeing establishments, paper manufacturing plants, sugar refineries and the like, after the hot water has served its purpose in process it is usually discharged directly into a sewer or drainage canal. This hot waste water is of rather high temperature, and exhaustive study and investigation reveals that a fuel saving of from 20% to 50% may be effected by reclaiming the waste heat of the hot waste water for preheating the fresh, cold, incoming water or other fluids which have to be heated at present by primary steam.

In the heat reclaimers now known to the art, a gravity flow principle is utilized. This results in sluggish operation, inefficient heat exchange, a large and cumbersome construction and difficult maintenance due to necessity of frequent cleaning.

One object of our invention is to provide a waste heat reclaimer in which the principle of high rate of velocity in both waste and clean liquids and direct counter-flow of liquids are used, resulting in high rates of heat transfer and clean transfer surfaces due to scouring action from high velocity.

Another object of my invention is to provide a heat reclaimer which has a high rate of heat transfer in order to permit a more compact and efficient unit.

Other objects of our invention will appear from the following description.

In the drawings, which form part of the accompanying specification, and are to be read in connection therewith—

Fig. 1 illustrates a sectional elevation of a waste heat reclaimer embodying our invention.

Fig. 2 is a sectional plan view taken on the line 2—2, Fig. 1.

Fig. 3 is a sectional view taken on the line 3—3, Fig. 1.

Fig. 4 is a sectional view taken on the line 4—4, Fig. 1.

Fig. 5 is a fragmentary plan view of the top of our heat reclaimer showing the cover plates in position.

Fig. 6 is a fragmentary detail view showing filler members between the tubes.

In general, our invention contemplates the provision of a tank into which the hot waste water flows. The hot waste water is discharged into a settling tank or sump provided with a series of upstanding spikes in order to remove waste material, such as rags, pieces of cloth, strings and the like. It is to be understood that any suitable rough filtering means may be used to remove waste material before the hot waste water is discharged into our heat reclaimer.

Within the tank we position a heat exchanger which comprises a pair of tube sheets having headers secured thereto and a plurality of tubes extending therebetween. The fresh liquid to be heated flows through the tubes spirally and downwardly. The hot waste water passes through a filter and is pumped around the heat exchanging tubes upwardly and spirally in direct counterflow to the liquid to be heated. A centrifugal pump is used to induce the flow of the hot waste water. The motor which drives this pump is controlled by a liquid level control and also by a pressure control. The controls are so designed that the pump will automatically stop when the supply of hot waste water is insufficient. The pressure control is designed to stop the pump in event outlet pressure becomes excessive due to the closing of the outlet supply, when no fresh water is being drawn.

More particularly, referring now to the drawings, in which like reference numerals are used to indicate like parts in the several views, a tank 1 is provided for the reception of waste hot water, which enters the tank through opening 2 after being roughly filtered to remove rags, pieces of cloth, string and other waste material. A baffle plate 3 provides a waste water receiving chamber. Above the baffle plate 3 is fitted a filter screen 4 which removes impurities and prevents the clogging of the heat reclaimer. The tank 1 is covered with removable floor plates 5, which may be removed for inspection and cleaning purposes. The water receiving compartment formed by the baffle plate 3 is provided with a by-pass valve 6 which may be opened to by-pass the heat reclaimer and allow the waste water to flow directly into the sewer if it be desired to make an inspection of the exchanger at any time.

Mounted at one end of the tank 1 is an electric motor 7 which drives a centrifugal pump 8 to circulate the hot waste water. A switch 9 is controlled by a hydrostatic device 10 so that the motor will be automatically shut off in event the supply of hot waste water is diminished. An outlet pressure device 11 controls the switch 12 to shut off the motor in event that the outlet pressure becomes excessive. Positioned within the tank 1 is a heat exchanger 13, which comprises a pair of tube sheets 14 and 15. Vertically positioned between the tube sheets is a baffle plate 16, dividing the tubes 17 into two sections. The tubes on one side of the baffle plate 16 are inclined in one direction, and the tubes on the other side of the baffle plate 16 are inclined in the opposite direction. Secured to the tube sheets 14 and 15 are headers 18 and 19. The headers 18 and 19 are divided into a plurality of compartments embracing each horizontal row of tubes, as can be seen from the drawings. The cold liquid to be heated, which, for the purpose of convenience will be referred to as the cold, fresh water, enters the uppermost compartment of header 19 through pipe 20. From the upper compartment of header 19, the water to be heated flows through the uppermost row of tube 17 to the upper compartment of header 18. As can be seen from the drawings, the water to be heated will continue downwardly from header to header through alternate sections of tubes 17 so that its flow will be in a spiral direction until it reaches the lowermost compartment of header 18, whence the heated water will flow outwardly through pipe 21. The hot waste water after being filtered through screen 4 flows into opening 22 of the centrifugal pump 8, and is discharged through connection 23 into the heat exchanger portion. The tubes of the heat exchanger 17 have positioned between them filler blocks 24, as can be seen by reference to Fig. 6. The baffle plate 16 and the filler blocks 24 form a spiral passage positioned around the exterior of the tubes 17.

As can be readily seen from Fig. 1 the baffle plate 16 is provided with cut-away portions at each end to allow the passage of the heating medium. When the hot waste water flows through connection 23 into the compartment formed by the baffle plate and the lowermost row of tubes and their filler blocks 24, it will be forced around the end of the baffle plate into the next higher compartment. The tubes being inclined oppositely on each side of the baffle plate, form a spiral path which will permit the hot waste water to flow upwardly in a spiral direction and in counterflow to the cold, fresh water being heated.

It is to be understood that while we have shown filler strips between the tubes 17, any suitable construction may be used which will cause a spiral passage way to be outlined through which the heating medium may flow.

It will be appreciated from the foregoing that the filler strips between the individual tubes of the horizontal rows provide a distinct channel or passage between one complete horizontal row of tubes and a complete row immediately above or below. Positioned transversely across the bottom of the tank 1 is a flushing pipe 25 provided with a plurality of apertures 26. A valve 27 is provided to permit water under pressure to flow into pipe 25 to flush out or wash down the bottom of the waste water receiving tank 1.

The rectangular shell 13 of the heat exchanger carries the tube sheets 14 and 15. The tube sheets are electrically welded to shell 13. The headers 18 and 19 are bolted to the respective tube sheets, and are provided with necessary gaskets between the faces of the tube sheets and the headers to assure a liquid tight joint when in position. The sides of the rectangular tank 13 are provided with large, easily removable inspection doors 28. The tube sheets are accurately drilled to receive the tubes 17, the ends of which are rigidly expanded into the tube sheets 14 and 15.

In operation the hot waste water enters the tank 1 through hot waste water inlet connection 2, where it flows over baffle plate 3 through screen 4 and into the receiving tank proper. Here the circulating pump 8 picks up the hot waste water through inlet opening 22 and discharges it at the low point of the exchanger shell into the connection 23 which is located on one side of the vertical baffle 16. The hot waste water then flows at high velocity through the channel or passage formed by tubes 17 and filler strips 24 and directly parallel to diaphragm baffle plate 16. The hot waste water flows the full length of the shell and on one side of the baffle plate 16 in one direction, flows through the opening between the edge of the baffle plate 16 and the tube sheet 15, and returns in an opposite direction on the other side of the diaphragm baffle plate 16 flowing toward the tube sheet 14 where it is again diverted in an opposite direction by flowing around the edge of the baffle plate 16 and the tube sheet 14. It is to be understood that the hot water will flow upwardly.

This alternate arrangement provides a continuous, upward, spiral flow of the waste water until it finally leaves the exchanger at waste water outlet connection 30 where it is discharged into the sewer through pipe 31. The pipe 31 provides an overflow for the hot waste water in event that the pump fails or stops for some reason, or in event that the current fails. There is no physical connection between the waste water outlet 30 and the water outlet connection 31. Connection 30 is of small diameter pipe and is merely inserted into the larger diameter connection 31.

The cold, fresh incoming water enters the exchanger through cold water connection 20 on header 19 and flows through the inside of tube 17 on one side of the baffle plate 16, and in a direction opposite to the direction of the flow of the hot waste water surrounding the tubes. The fresh water flowing through the tubes and entering the steel header 18 is caused by the circulating partitions in header 18 to be diverted to the tubes on the other side of the baffle plate 16 where after entering the tubes it will return in a directly opposite direction on the other side of the baffle plate 16 to header 19.

The alternate arrangement provides a continuous downward spiral flow of the fresh water on the inside of the tubes in absolute counter-flow to the waste water on the outside of the tubes. The fresh water will continue downwardly until it reaches the hot fresh water outlet connection 21.

The by-pass valve 6 is closed when our heat reclaimer is in use. If it is desired to make an inspection of the exchanger at any time, the flapper valve 6 is simply raised by means of a chain 32 and hooked in an open position. The waste water will then flow out to the sewer directly through a pipe connection provided for that purpose.

From time to time the flushing pipe 25 may be connected to a water supply to flush out the inside of the receiving tank 6.

The automatic level control 9 is a two-pointed electric switch operated by a hydrostatic device 10. A variation of the water level or head in the receiving tank which causes a fluctuation of pressure on the hydrostatic device 10 to operate the switch 9 to shut off the motor when the head drops below a predetermined point, as, for example, at about 2" below the waste water overflow connection 31. The pump will automatically start and continue to operate until the level falls to a point which may be set upon the hydrostatic device 10.

The automatic pressure control comprises a switch 12 and a hydrostatic device 11 which is connected to the fresh water line. A drop in pressure in the fresh water line caused by any demand of hot water will actuate the switch 12. This control is so adjusted that the motor will operate when there is a fresh hot water demand on the reclaimer. These controls are independent of each other so that the pump will be operated by either. This arrangement permits of an economical operation, since the pump will not operate unless there is a demand for hot fresh water, nor can the hot waste water flow to the sewer by way of waste water outlet 8, as the pump will automatically start when the water level on the waste water receiving tank is within about 2" below the waste water outlet connection 31.

It is to be understood that certain features and sub-combinations are of utility and may be employed without reference to other features and sub-combinations. This is contemplated by and is within the scope of our claims. It is further obvious that various changes may be made in detail within the scope of our claims without departing from the spirit of our invention. It is, therefore, to be understood that our invention is not to be limited to the specific details shown and described.

Having thus described our invention, what we claim is:

1. In a heat exchanger, the combination comprising a pair of spaced headers positioned parallel to each other, a plurality of vertically spaced partitions within said headers forming a number of compartments therein, tubes in horizontal alignment in the respective single planes extending between the compartments of the respective headers, said planes being at an angle to the plane perpendicular to said headers.

2. In a heat reclaimer, the combination including, a tank, a partition dividing said tank into two compartments, a filter screen positioned in said partition, a heat exchanger placed in one of said compartments, a waste hot water inlet leading to the other of said compartments, fresh water inlet and outlet openings for said heat exchanger and a pump for inducing waste hot water to flow through said heat exchanger in heat exchanging relationship with the fresh water.

3. In a heat reclaimer, the combination including, a tank, a partition dividing said tank into two compartments, a filter screen positioned in said partition, a heat exchanger positioned in one of said compartments, a waste hot water inlet leading to the other of said compartments, fresh water inlet and outlet openings for said heat exchanger, a pump for inducing waste hot water to flow through said heat exchanger in heat exchange relationship with the fresh water, and a hydrostatically operated control means for starting and stopping said pump.

4. A heat reclaimer according to claim 2 in which said heat exchanger comprises the combination including a pair of spaced headers parallel to each other, a plurality of tubes extending between said headers in planes at an angle to a plane perpendicular to said headers.

5. A heat exchanger comprising in combination, a pair of headers spaced apart and disposed parallel to each other, a baffle plate extending between said headers substantially in the medial plane thereof, tubes extending between said headers on both sides of said baffle plate, the tubes of one side of said baffle plate being in planes inclined in one direction to a plane perpendicular to said headers and the tubes on the other side of said baffle plate being in planes inclined in the opposite direction with respect to said perpendicular plane.

6. A heat reclaimer comprising a tank and a heat exchanger according to claim 5, positioned therein.

7. In a heat reclaimer, the combination including, a tank, a partition dividing said tank into two compartments, a filter screen carried by said partition, a heat exchanger positioned in one of said compartments, said heat exchanger comprising a pair of headers spaced apart and disposed parallel to each other, a baffle plate extending between said headers substantially in the medial plane thereof, tubes extending between said headers on both sides of said baffle plate, the tubes on one side of said baffle plate being in planes inclined in one direction to a plane perpendicular to said headers and the tubes on the other side of said baffle plate being in planes inclined in the opposite direction with respect to said perpendicular plane, a waste hot water inlet leading to the other of said compartments, fresh water inlet and outlet openings on said heat exchanger, and a pump for inducing waste hot water to flow through said heat exchanger in heat exchanging relationship with the fresh water.

8. A heat exchanger according to claim 5 in which the interspatial distances between adjacent tubes in one plane are provided with occluding means.

9. A heat reclaimer according to claim 2 in which a flushing pipe is positioned in said tank, said flushing pipe being provided with a plurality of jets and means for leading flushing fluid under pressure thereto.

In testimony whereof we affix our signatures.

GEORGE T. JACOCKS.
STANLEY J. CHUTE.
JOHN L. KRIEG.